(12) United States Patent
Tamura et al.

(10) Patent No.: US 11,969,779 B2
(45) Date of Patent: Apr. 30, 2024

(54) MANDREL, BENT TUBE, AND METHOD AND APPARATUS FOR PRODUCING BENT TUBE

(71) Applicant: Nippon Steel Corporation, Tokyo (JP)

(72) Inventors: Shohei Tamura, Tokyo (JP); Hidehiro Arita, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 37 days.

(21) Appl. No.: 17/590,927

(22) Filed: Feb. 2, 2022

(65) Prior Publication Data

US 2022/0212240 A1 Jul. 7, 2022

Related U.S. Application Data

(62) Division of application No. 16/484,531, filed as application No. PCT/JP2018/005920 on Feb. 20, 2018, now Pat. No. 11,278,947.

(30) Foreign Application Priority Data

Feb. 21, 2017 (JP) ................................. 2017-029804

(51) Int. Cl.
*F16L 43/00* (2006.01)
*B21D 9/05* (2006.01)
*B21D 9/07* (2006.01)

(52) U.S. Cl.
CPC .............. *B21D 9/07* (2013.01); *F16L 43/001* (2013.01); *B21D 9/05* (2013.01)

(58) Field of Classification Search
CPC ................................ F16L 43/00; F16L 43/001
USPC ....................................................... 285/179
See application file for complete search history.

(56) References Cited

U.S. PATENT DOCUMENTS 3,105,538 A 10/1963 Spates
3,869,917 A * 3/1975 Lapp
(Continued)

FOREIGN PATENT DOCUMENTS

CN 1911550 A 2/2007
JP S59-001026 A 1/1984
(Continued)

OTHER PUBLICATIONS

The American Society of Mechanical Engineers, Power Piping ASME Code For Pressure Piping, B31, ASME B31.1-2001, p. 42 (Year: 2001).*

(Continued)

*Primary Examiner* — Zachary T Dragicevich
*Assistant Examiner* — William S. Choi
(74) *Attorney, Agent, or Firm* — Banner & Witcoff, Ltd.

(57) ABSTRACT

A mandrel 10 for producing a thin-walled bent tube having a bending portion with high strength and a small radius of curvature by rotary draw bending without either cracks in an outside of bend or wrinkles and buckling in an inside of bend occurring includes a shank 14, a connection mechanism 15 and a mandrel ball 16. In a cross-section orthogonal to an axial direction of the mandrel ball 16 at a central position in the axial direction of the mandrel ball 16, the mandrel ball 16 has a first position 19 and a second position 20 at which a first straight line m that passes through a mandrel ball center 17 meets an outer periphery 21 of the mandrel ball. Further, a ratio ($L_1/L_2$) between a dimension $L_1$ from the mandrel ball center 17 to the first position 19 and a dimension $L_2$ from the mandrel ball center 17 to the second position 20 is in a range of 0.915 to 0.976.

1 Claim, 5 Drawing Sheets

(56) References Cited

U.S. PATENT DOCUMENTS

| | | | | |
|---|---|---|---|---|
| 5,828,003 | A | * | 10/1998 | Thomeer |
| 5,909,908 | A | | 6/1999 | Furuse |
| 5,937,686 | A | | 8/1999 | Arai |
| 7,127,920 | B1 | | 10/2006 | Su |
| 7,578,160 | B2 | * | 8/2009 | Caporusso |

FOREIGN PATENT DOCUMENTS

| | | | | |
|---|---|---|---|---|
| JP | S61-030226 | A | | 2/1986 |
| JP | H7-290156 | A | | 11/1995 |
| JP | 2001-232421 | A | | 8/2001 |
| JP | 2006-187785 | A | | 7/2006 |
| JP | 2009172661 | A | | 8/2009 |
| JP | 2009180610 | A | * | 8/2009 |
| JP | 2013-071143 | A | | 4/2013 |
| JP | 2015-131308 | A | | 7/2015 |

OTHER PUBLICATIONS

JP-2009180610-A—Machine Translation—English (Year: 2009).*
Sep. 11, 2018 (JP) Office Action Application No. 2018-526729.
Dec. 11, 2018 (JP) Office Action Application No. 2018-526729.
English machine translation of JPH07-290156A.
English machine translation of JPS61-30226A.
English machine translation of JP2009-172661A.
English machine translation of JPS59-1026A.
English machine translation of JP2015-131308A.

* cited by examiner

MANDREL, BENT TUBE, AND METHOD AND APPARATUS FOR PRODUCING BENT TUBE

RELATED APPLICATIONS

This application is a divisional of U.S. patent application Ser. No. 16/484,531, filed Aug. 8, 2019, which is a National Stage Application under 35 U.S.C. 371 of expired PCT application PCT/JP2018/005920 designating the United States and filed Feb. 20, 2018; which claims the benefit of JP application number 2017-029804 and filed Feb. 21, 2017, each of which are hereby incorporated by reference in their entireties.

TECHNICAL FIELD

The present invention relates to a mandrel and a bent tube, and also to a production method and a production apparatus for producing the bent tube.

BACKGROUND ART

Several methods for producing a bent tube by bending an original tube that is a straight tube made of a metal such as steel, aluminum or aluminum alloy are already known. Among these, rotary draw bending is widely used as a bending process for efficiently producing a bent tube for its fast machining speed, even though large local distortions arise in the bent tube.

FIG. 5(a) and FIG. 5(b) are explanatory drawings that schematically and chronologically illustrate the circumstances when producing a bent tube 6 by rotary draw bending. Note that, in the description hereinafter, a case in which the tube is a steel tube is taken as an example.

As illustrated in FIG. 5(a) and FIG. 5(b), rotary draw bending is performed using a bending die 2, a cramping die 3, a wiper 4 and a pressure die 5. In the rotary draw bending, an axial end portion of an original tube 1 is gripped by the bending die 2 and the cramping die 3, and the original tube 1 is pressed against the rotating bending die 2 for bending the shell 1 while applying a tensile load in the axial direction of the original tube 1.

The bending die 2 has a groove 2a that guides a portion corresponding to inside of bend 1a of the original tube 1. The bending die 2 is disposed so as to be freely rotatable two-dimensionally about a central axis of rotation 2b. The cramping die 3 presses an end portion at inside of bend 1c of the original tube 1 against the bending die 2 by pressing an end portion at outside of bend 1b of the original tube 1.

The cramping die 3 is disposed so as to be freely rotatable two-dimensionally about the central axis of rotation 2b together with the bending die 2. The wiper 4 supports the portion corresponding to inside of bend 1a of the original tube 1. In addition, the pressure die 5 presses the portion corresponding to inside of bend 1a of the original tube 1 against the wiper 4 by pressing a portion corresponding to outside of bend 1d of the original tube 1.

At the time of machining, tensile strain arises in the original tube 1 mainly in the axial direction. The tensile strain amount of the portion corresponding to outside of bend 1d is greater than the tensile strain amount of the portion corresponding to inside of bend 1a. Therefore, if the bending conditions such as the bending speed and tensile force are not appropriate, the tensile strain amount of the portion corresponding to outside of bend 1d will exceed the rupture limit of the original tube 1, and consequently the original tube 1 will rupture. When performing rotary draw bending, it is important to reduce the tensile strain amount of the portion corresponding to outside of bend 1d as much as possible by appropriately selecting the bending conditions.

As means for reducing the tensile strain amount of the portion corresponding to outside of bend 1d of the original tube 1, it has been known to apply a compressive force in the axial direction of the original tube 1 by:

(a) pushing the original tube 1 in the axial direction by means of a back booster 7; or (b) moving the pressure die 5 in the feeding direction of original tube at a higher speed than the rotational speed of the bending die 2.

For example, post-processing such as tube hydroforming may in some cases be performed on the bent tube 6 that was produced by rotary draw bending. A comparatively large load is continuously applied to the bent tube 6 by tube hydroforming.

Even if the original tube 1 does not rupture during the rotary draw bending, the bent tube 6 will rupture if the total amount of the tensile strain amount that is already present in the bent tube 6 due to rotary draw bending and the strain amount that is newly generated by tube hydroforming exceeds the rupture limit. This total amount is not the simple total amount of strain, but rather is a total amount that is based on plasto-mechanical principles. To prevent rupturing of the bent tube 6, it is effective to reduce the tensile strain amount that is produced in the original tube 1 by the rotary draw bending.

Heretofore, there have been many cases in which the bent tube 6 has been produced as an end product by rotary draw bending, or in which a strain amount that is applied to the bent tube 6 by tube hydroforming after rotary draw bending has not been large.

Consequently, heretofore, when producing the bent tube 6 by rotary draw bending, attention has been paid to inhibiting as much as possible the flattening of a bending portion 9 under conditions such that the portion corresponding to outside of bend 1d of the original tube 1 does not rupture. A mandrel (also referred to as a "core bar" or a "core") 8 has been used as an effective tool for that purpose.

The mandrel 8 includes a shank (handle) 8a, a connection mechanism 8b such as, for example, a spherical bearing, and a mandrel ball 8c supported in a two-dimensionally or three-dimensionally displaceable manner with respect to the shank 8a by the connection mechanism 8b.

The mandrel 8 is disposed inside the original tube 1 in a manner such that a gap exists between the mandrel 8 and the original tube 1. The mandrel 8 shown in FIG. 5(a) and FIG. 5(b) has two connection mechanisms 8b and two mandrel balls 8c. The two mandrel balls 8c that each have a circular cross section which are disposed at the front end of the shank 8a inhibit flattening of the bending portion 9.

Patent Documents 1 to 3 disclose mandrels that are used in rotary draw bending.

LIST OF PRIOR ART DOCUMENTS

Patent Document

Patent Document 1: JP7-290156A
Patent Document 2: JP2001-232421A
Patent Document 3: JP2006-187785A

SUMMARY OF INVENTION

Technical Problem

In recent years, there is a demand for enhancing the strength and reduce the thickness of the wall of the bent tube 6 to thereby achieve a further reduction in the weight of industrial products that adopt the bent tube 6 as a starting material. In addition, there is a demand for achieving a smaller radius of curvature as well as wall thinning of the wall of the bending portion 9 of the bent tube 6 to thereby achieve a reduction in the size of such industrial products.

The present inventors conducted studies and investigations regarding producing the bent tube 6 having the bending portion 9 which has high strength, a small radius of curvature and a thin wall by rotary draw bending. As a result, the present inventors newly discovered that not only does rupturing occur due to a localized thickness reduction at an outside of bend 9b of the bending portion 9 as is conventionally known, but also that wrinkles or buckling also occurs at an inside of bend 9a. Naturally a ruptured bent tube 6 cannot be used as the starting material of an end product, and the bent tube 6 in which wrinkles or buckling has occurred can also not be used as the starting material.

An objective of the present invention is to produce, by rotary draw bending, a bent tube having a bending portion that has high strength or that has a small radius of curvature with a thin wall in a manner in which ruptures do not occur at an outside of bend of a bending portion and in which wrinkles and buckling at an inside of bend are each within an allowable range.

Solution to Problem

The present inventors conducted intensive studies to solve the above problem, and as a result obtained findings A to C described hereunder, and then conducted further studies to thereby complete the present invention.

(A) When producing the bent tube 6 by performing rotary draw bending on the original tube 1 using a conventional mandrel ball having a circular cross section, there is a trade-off relation between thickness reduction and flattening of the bending portion 9.

For example, when the arrangement position of the mandrel 8 is advanced toward the bending portion 9 side (the rightward direction in FIG. 5(a)) from a reference position to increase the action of the mandrel 8, although flattening of the bending portion 9 can be inhibited, rupturing is liable to occur at the outside of bend 9b of the bending portion 9.

In contrast, when the arrangement position of the mandrel 8 is drawn back in the leftward direction in FIG. 5(b) from the reference position to weaken the action of the mandrel 8, although the occurrence of rupturing at the outside of bend 9b of the bending portion 9 can be inhibited, flattening of the bending portion 9 is noticeable.

(B) If a mandrel ball (hereinafter, also referred to as an "asymmetrical mandrel ball") having a shape in which, in a cross-section orthogonal to the axial direction of the mandrel ball at a central position in the axial direction of the mandrel ball, a dimension from the mandrel ball center to a first position of the mandrel ball located facing a portion corresponding to outermost of bend of a straight tube is smaller by a predetermined amount than a dimension from the mandrel ball center to a second position of the mandrel ball located facing a portion corresponding to innermost of bend of the straight tube is used in place of the conventional mandrel ball 8c shown in FIG. 5(a) and FIG. 5(b), when performing rotary draw bending, a gap between the mandrel ball and the portion corresponding to outside of bend of the original tube can be made larger than when using the conventional mandrel ball.

By this means, flattening of the bending portion and wrinkles or buckling that occurs on the inside of bend can be inhibited to an allowable level while preventing the occurrence of rupturing on the outside of bend of the bending portion.

(C) A bent tube produced using the asymmetrical mandrel ball has high strength and also has both an appropriate flattening ratio and a thickness reduction ratio of a satisfactory level. Therefore, the bent tube can be used as the starting material for a product as it is without being performed a secondary operation such as tube hydroforming, or can be subjected to a secondary operation to thereby produce an end product.

The present invention is as enumerated hereunder.

(1) A mandrel including: a shank, a connection mechanism being in a spherical contact with the shank so as to be rotatable in an arbitrary direction, and a mandrel ball supported in a two-dimensionally or three-dimensionally displaceable manner with respect to the shank by the connection mechanism; wherein:

the mandrel has only one set of a combination of the connection mechanism and the mandrel ball; and in a cross-section orthogonal to an axial direction of the mandrel ball at a central position in the axial direction of the mandrel ball, the mandrel ball has a first position and a second position at which a first straight line that passes through a mandrel ball center meets an outer periphery of the mandrel ball, and a ratio ($L_1/L_2$) between a dimension $L_1$ from the mandrel ball center to the first position and a dimension $L_2$ from the mandrel ball center to the second position is in a range of 0.915 or more to 0.976 or less.

(2) The mandrel according to item (1) above, wherein, in the cross-section orthogonal to the axial direction of the mandrel ball at a central position in the axial direction of the mandrel ball, the mandrel ball has a first region surrounded by a second straight line orthogonal to the first straight line and an outer periphery of the mandrel ball which includes the first position, and a second region surrounded by the second straight line and an outer periphery of the mandrel ball which includes the second position.

(3) The mandrel according to item (1) or (2) above, wherein, in the cross-section orthogonal to the axial direction of the mandrel ball at a central position in the axial direction of the mandrel ball, the outer periphery of the mandrel ball in the first region and the outer periphery of the mandrel ball in the second region are continuously connected.

(4) The mandrel according to item (2) or (3) above, wherein, in the cross-section orthogonal to the axial direction of the mandrel ball at a central position in the axial direction of the mandrel ball, a shape of the outer periphery of the mandrel ball in the second region is semicircular.

(5) A method for producing a bent tube having a bending portion that is two-dimensionally bent by performing rotary draw bending on an original tube using:

a two-dimensionally rotatable bending die having a groove for guiding a portion corresponding to inside of bend of the original tube that is a straight tube;

a cramping die that presses an end portion at outside of bend of the original tube to thereby press an end portion at inside of bend of the original tube against the bending die, the cramping die being two-dimensionally rotatable together with the bending die;

a wiper that supports the portion corresponding to inside of bend of the original tube; and a pressure die that presses a portion corresponding to outside of bend of the original tube to thereby press the portion corresponding to inside of bend of the original tube against the wiper;

wherein the rotary draw bending is performed by disposing a mandrel according to any one of items (1) to (4) above inside the original tube in a manner such that the first position of the mandrel ball is located facing a portion corresponding to outermost of bend of the original tube and the second position of the mandrel ball is located facing a portion corresponding to innermost of bend of the original tube.

(6) The method for producing a bent tube according to item (5) above, wherein the rotary draw bending is performed while applying a compressive force in an axial direction to the original tube.

(7) An apparatus for producing a bent tube having a bending portion that is two-dimensionally bent by performing rotary draw bending on an original tube, including:

a two-dimensionally rotatable bending die having a groove for guiding a portion corresponding to inside of bend of the original tube that is a straight tube;

a cramping die that presses an end portion at outside of bend of the original tube to thereby press an end portion at inside of bend of the original tube against the bending die, the cramping die being two-dimensionally rotatable together with the bending die;

a wiper that supports the portion corresponding to inside of bend of the original tube; and a pressure die that presses a portion corresponding to outside of bend of the original tube to thereby press the portion corresponding to inside of bend of the original tube against the wiper;

the apparatus further including a mandrel according to any one of items (1) to (4) above that is to be disposed inside the original tube, wherein the mandrel is disposed in a manner such that the first position of the mandrel ball is located facing a portion corresponding to outermost of bend of the straight tube, and the second position of the mandrel ball is located facing a portion corresponding to innermost of bend of the straight tube.

(8) The apparatus for producing a bent tube according to item (7) above, including means for applying a compressive force in an axial direction to the original tube on which the rotary draw bending is being performed.

(9) A bent tube made of steel that includes a bending portion that is two-dimensionally bent and a straight tube portion, wherein:

when a wall thickness of the bending portion is represented by $t_1$ (mm), a wall thickness of the straight tube portion is represented by $t_2$ (mm), an outside diameter of the straight tube portion is represented by $D_1$ (mm), a bending radius of the bending portion is represented by R (mm), and a bending angle of the bending portion is represented by $\theta$ (°), $t_2/D_1$: 0.005 to 0.3,
$t_2$: 0.5 to 30,
$D_1$: 15 to 700,
R: $1D_1$ to $6D_1$,
$\theta$: 0 to 180, a maximum thickness reduction ratio: 14.5% or less, a maximum flattening ratio: 8.0% or less, and a hardness ratio between straight tube portion and bending portion: 8 to 50%;

where, the maximum thickness reduction ratio: a maximum value of $\{(t_2-t_1)\times 100(\%)$, the maximum flattening ratio: a maximum value of $\{$(maximum value of outside diameter−minimum value of outside diameter)$/D_1\}$ of the bending portion×100(%), and the hardness ratio between straight tube portion and bending portion: {(average value of values obtained by measuring an L cross-section of a center portion of an outside of bend of the bending portion at 5 points under conditions of a 1 mm pitch in a longitudinal direction of the tube with Hv (10 kg))−(average value of values obtained by measuring an L cross-section of the straight tube portion at 5 points under conditions of a 1 mm pitch in the longitudinal direction of the tube with Hv (10 kg))}/(average value of values obtained by measuring the L cross-section of the straight tube portion at 5 points under conditions of a 1 mm pitch in the longitudinal direction of the tube with Hv (10 kg)).

Advantageous Effects of Invention

According to the present invention, a thin-walled bent tube having a bending portion with high strength or with a small radius of curvature can be produced by cold working by means of rotary draw bending, in which flattening of a cross-section of a bending portion is inhibited to an allowable level and the occurrence of wrinkles and buckling on an inside of bend are each also inhibited to an allowable level while preventing the occurrence of rupturing on an outside of bend of the bending portion.

The bent tube according to the present invention has high strength and also has both an appropriate flattening ratio and a thickness reduction ratio of a satisfactory level. Therefore, the bent tube according to the present invention can thereafter be used as the starting material of a product as it is without being performed a secondary operation such as tube hydroforming, or can be made into an end product by further performing a secondary operation.

DESCRIPTION OF EMBODIMENTS

Figure 1:
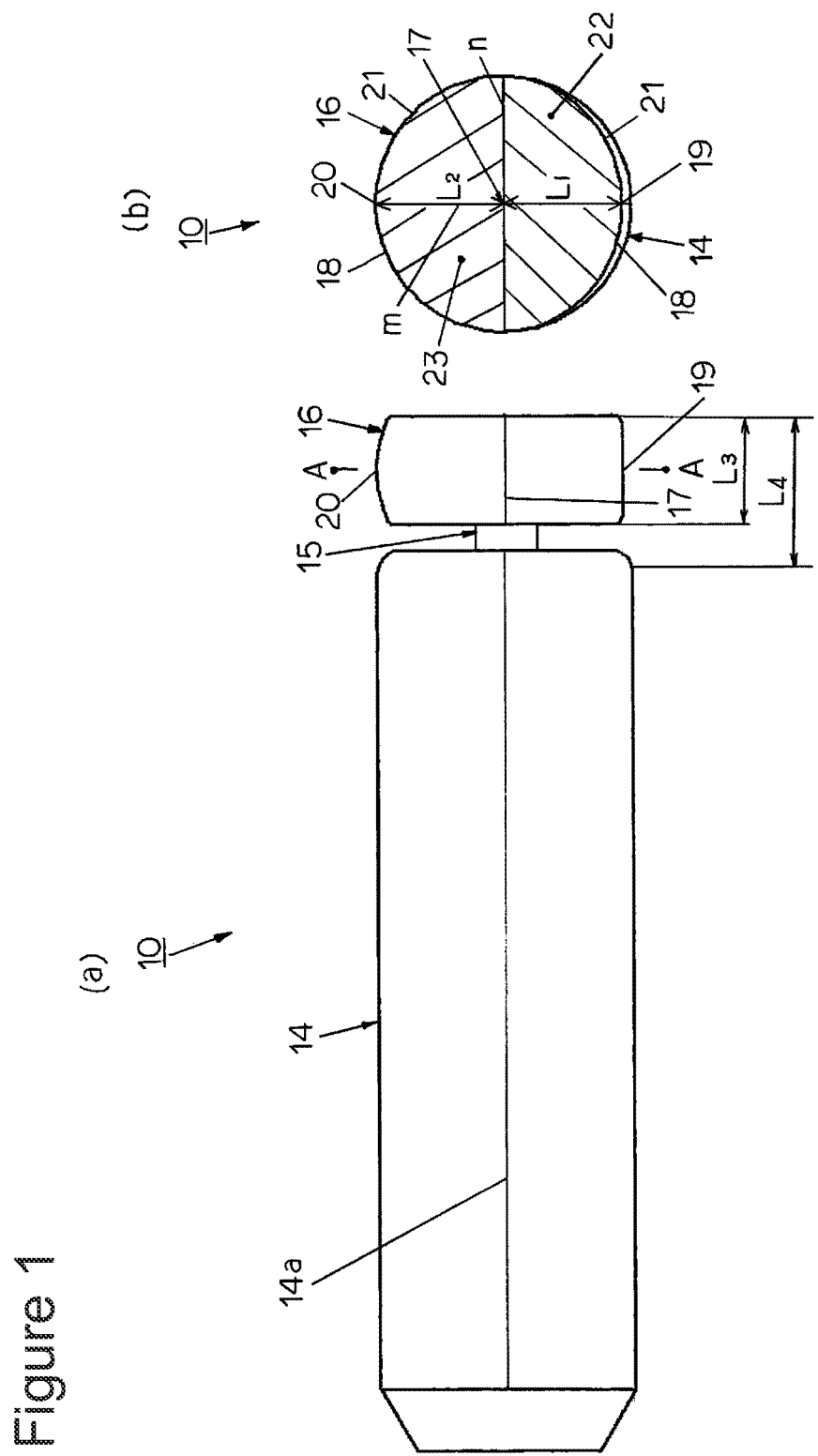
FIG. 1(a) is a side view illustrating a mandrel according to the present invention.
FIG. 1(b) is a cross-sectional view along a line A-A in FIG. 1(a).

The present invention will now be described. In the following description, a case in which an original tube is a high tensile strength steel tube of 980 MPa-grade, in other words, a tube having a tensile strength in the range of 980 to 1179 MPa, is taken as an example. The present invention is not limited to a high tensile strength steel tube. The present invention is equally applicable to a case where an original tube is a steel tube having a tensile strength of less than 980 MPa, a stainless steel tube, a pure aluminum tube for industrial use, an aluminum alloy tube, a pure titanium tube for industrial use or a titanium alloy tube.

1. Mandrel 10 According to the Present Invention

FIG. 1(a) is a side view illustrating a mandrel 10, and FIG. 1(b) is a cross-sectional view along a line A-A in FIG. 1(a) that shows a cross-section at a central position in the axial direction of a mandrel ball 16. FIG. 2 is an explanatory drawing illustrating a state at the start of rotary draw bending. FIG. 3 is an explanatory drawing illustrating a state at the end of rotary draw bending.

As illustrated in FIG. 1(a), the mandrel 10 includes a shank 14, a connection mechanism 15 and the mandrel ball 16. The connection mechanism 15 is provided in the shank 14. The connection mechanism 15 is rotatably disposed in an arbitrary direction by spherical contact with the shank 14.

The mandrel ball 16 is supported by the connection mechanism 15. The mandrel ball 16 is disposed in a manner in which the mandrel ball 16 is freely rotatable in two-dimensional or three-dimensional direction with respect to the shank 14 by the connection mechanism 15. The maximum value of a displacement angle of the mandrel ball 16 with respect to the shank 14 is 40°. The mandrel 10 is disposed inside an original tube 11, illustrated in FIG. 2, in a manner such that a gap exists between the mandrel 10 and the original tube 11.

It suffices that the material of the shank 14, the connection mechanism 15 and the mandrel ball 16 is a material that is commonly used for a mandrel of this kind, and for example, an alloy tool steel is used.

As illustrated in FIGS. 2 and 3, when producing a bent tube 13 having a bending portion 12-1 by performing rotary draw bending on the original tube 11, the mandrel 10 is disposed inside the original tube 11 and used for inhibiting flattening of the cross-section of the bending portion 12-1.

As illustrated in FIG. 1(b), in a cross-section orthogonal to the axial direction of the mandrel ball 16 at a central position in the axial direction of the mandrel ball 16, the mandrel ball 16 has a first position 19 and a second position 20 at which a first straight line m that passes through a mandrel ball center 17 which matches a shank center 14a meets an outer periphery 21 of the mandrel ball.

A ratio ($L_1/L_2$) between a dimension $L_1$ from the mandrel ball center 17 to the first position 19 and a dimension $L_2$ from the mandrel ball center 17 to the second position 20 is within a range of 0.915 to 0.976, and preferably is within a range of 0.915 to 0.953. In other words, the dimension $L_1$ is smaller than the dimension $L_2$ by an amount equivalent to a percentage within the range of 2.4 to 8.5%, and preferably a percentage within the range of 4.7 to 8.5%. Thus, the mandrel ball 16 is an asymmetrical mandrel ball.

Because the mandrel ball 16 is an asymmetrical mandrel ball, a gap between the mandrel ball 16 and a portion corresponding to outside of bend 11d of the original tube 11 can be enlarged in comparison to the conventional configuration. By this means, while preventing the occurrence of rupturing of an outside of bend 12b of the bending portion 12-1 of the bent tube 13, flattening of the cross-section of the bending portion 12-1 as well as the occurrence of wrinkles or buckling at an inside of bend 12a can each be inhibited to an allowable level.

As illustrated in FIG. 1(b), in a cross-section orthogonal to the axial direction of the mandrel ball 16 at a central position in the axial direction of the mandrel ball 16, the mandrel ball 16 has a first region 22 surrounded by a second straight line n that is orthogonal to the first straight line m, and the outer periphery 21 of the mandrel ball which includes the first position 19. In addition, the mandrel ball 16 has a second region 23 surrounded by the second straight line n and the outer periphery 21 of the mandrel ball which includes the second position 20. In FIG. 1(b), the first region 22 is denoted by hatching that slopes in the right-upward direction, and the second region 23 is denoted by hatching that slopes in the right-downward direction.

As illustrated in FIG. 1(b), it is preferable that the outer periphery 21 of the mandrel ball in the first region 22 and the outer periphery 21 of the mandrel ball in the second region 23 are smoothly connected continuously in order to inhibit deformation of the bent tube 13. However, the present invention is not limited thereto.

It suffices that the shape of the outer periphery 21 of the mandrel ball in the first region 22 is a shape that can make a gap between the mandrel ball 16 and the portion corresponding to outside of bend 11d of the original tube 11 larger than a gap between the mandrel ball 16 and a portion corresponding to inside of bend 11a of the original tube 11. Therefore, for example, it is also acceptable for a step height or a concave to exist at a meeting position between the outer periphery 21 of the mandrel ball in the first region 22 and the outer periphery 21 of the mandrel ball in the second region 23.

Further, in the cross-section orthogonal to the axial direction of the mandrel ball 16 at a central position in the axial direction of the mandrel ball 16, it is not necessary for the outer periphery 21 of the mandrel ball in the first region 22 to be a curve having a constant curvature.

It is preferable that, when the outside diameter of the original tube 11 is represented by $D_1$ (mm), if within the range of a small diameter tube ($\phi$25.4 to $\phi$114.3), a dimension $L_3$ in the axial direction of the mandrel ball 16 is within the range of 0.3 $D_1$ to 0.5 $D_1$.

Further, if within the range of a small diameter tube ($\phi$25.4 to $\phi$114.3), it is preferable that a distance $L_4$ in the mandrel axial direction from the position of the most frontward end portion of the mandrel ball 16 to a reference position that is described later is in the range of 0.5 $D_1$ to 0.7 $D_1$ in order to inhibit flattening of the cross-section of the bending portion 12-1 as well as the occurrence of wrinkles or buckling on the inside of bend 12a to an allowable level, respectively, while preventing the occurrence of ruptures in the outside of bend 12b of the bending portion 12-1.

As illustrated in FIG. 1(b), it is preferable that, in a cross-section orthogonal to the axial direction of the mandrel ball 16 at a central position in the axial direction of the mandrel ball 16, the shape of the outer periphery 21 of the mandrel ball of the second region 23 is for example, semicircular, since the shape follows the inner surface shape of the inside of bend 12a of the bent tube 13.

In FIG. 2, the mandrel 10 is disposed so that the first position 19 of the mandrel ball 16 is located facing a portion corresponding to outermost of bend 11e of the original tube 11, and the second position 20 of the mandrel ball 16 is located facing a portion corresponding to innermost of bend 11f of the straight tube 11. However, the present invention is not limited to this configuration.

Specifically, in the case of the cross-section illustrated in FIG. 1(b), that is, in a case where the size of a central angle of the mandrel ball center 17 in a cross-section orthogonal to the axial direction of the mandrel ball 16 at a central position in the axial direction of the mandrel ball 16 is taken as 0°, the effect of the present invention is obtained even if the mandrel 10 is disposed in a manner in which the aforementioned central angle is shifted within a range of ±30°, preferably a range of ±15°, relative to the straight tube 11.

The structure of the mandrel 10 other than the structure described above may be the same as a structure that is commonly used in a mandrel of this kind, and because such a structure is well-known to persons having ordinary skill in the art, a description thereof is omitted herein.

2. Production Apparatus 30 According to the Present Invention

As illustrated in FIGS. 2 and 3, a production apparatus 30 is an apparatus that subjects the original tube 11 to rotary draw bending to produce the bent tube 13 having the bending portion 12-1 that is two-dimensionally bent.

When the tensile strength of the original tube 11 is 980 MPa or more, the effect of the present invention appears more markedly. The reason is that, when the tensile strength of the original tube 11 is 980 MPa or more, flattening of the cross-section of the bending portion 12-1, rupturing in the outside of bend 12b of the bending portion 12-1, and the occurrence of wrinkles or buckling in the inside of bend 12a during bending are marked.

Figure 5:
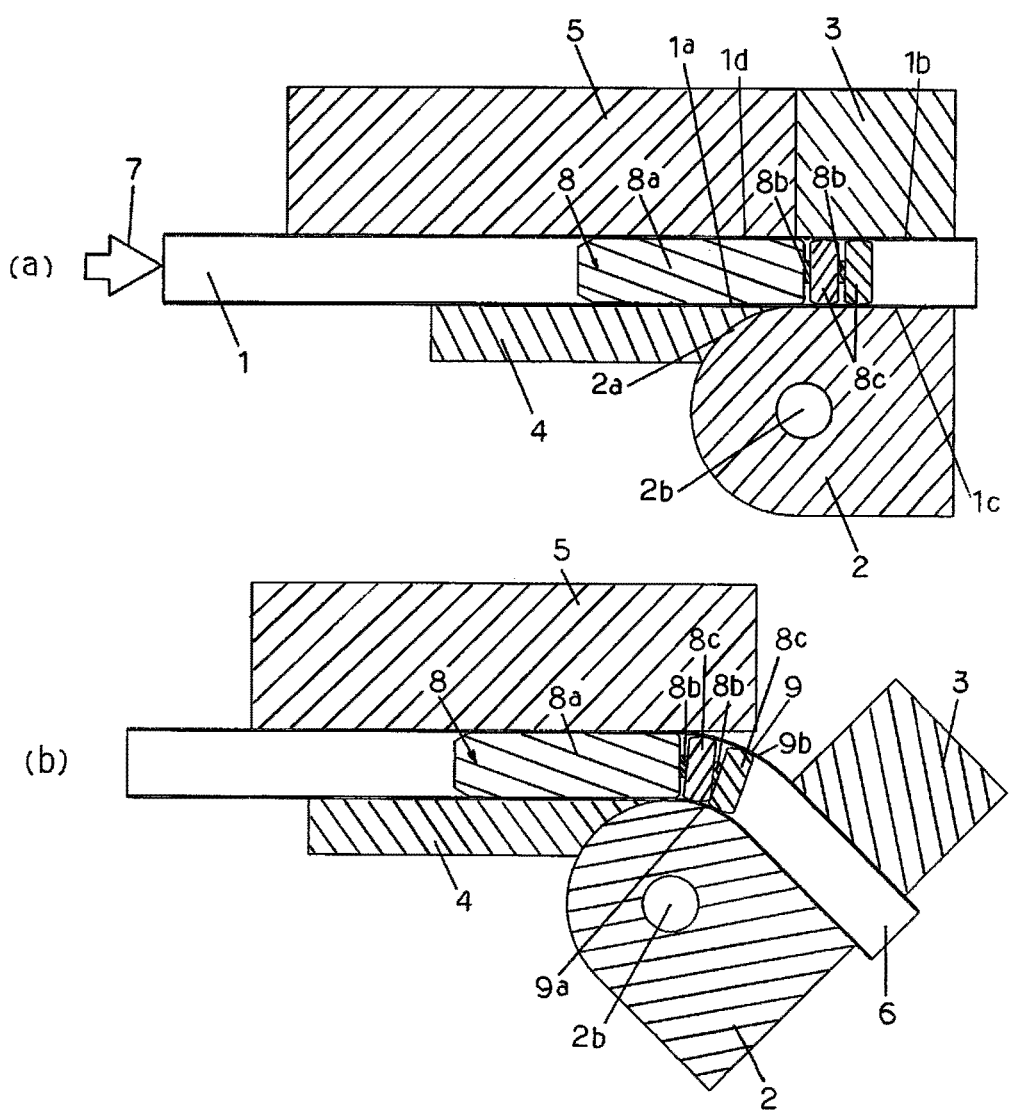
FIG. 5(a) and FIG. 5(b) are explanatory drawings that schematically and chronologically illustrate the circumstances when producing a bent tube by rotary draw bending.

Similarly to the conventional production apparatus illustrated in FIG. 5(a) and FIG. 5(b), the production apparatus 30 includes a bending die 31, a cramping die 32, a wiper 33 and a pressure die 34. The bending die 31 has a groove 31a. The groove 31a guides a portion corresponding to inside of bend 11a of the original tube 11. The bending die 31 is disposed so as to be two-dimensionally rotatable about a central axis of rotation 31b.

The cramping die 32 presses an end portion at outside of bend 11b of the original tube 11 to thereby press an end portion at inside of bend 11c of the original tube 11 against the bending die 31. The cramping die 32 is disposed so as to be two-dimensionally rotatable about the central axis of rotation 31b together with the bending die 31.

The wiper 33 supports the portion corresponding to inside of bend 11a of the original tube 11. Further, the pressure die 34 presses the portion corresponding to outside of bend 11d of the original tube 11 to thereby press the portion corresponding to inside of bend 11a of the original tube 11 against the wiper 33.

The production apparatus 30 further includes the mandrel 10. The mandrel 10 is disposed inside the original tube 11 in a manner such that a gap exists between the mandrel 10 and the original tube 11.

The mandrel 10 is disposed at a reference position inside the original tube 11 in a manner such that the first position 19 of the mandrel ball 16 is located facing the portion corresponding to outermost of bend 11e of the original tube 11, and the second position 20 of the mandrel ball 16 is located facing the portion corresponding to innermost of bend 11f of the original tube 11.

Here, the term "reference position" refers to a position at which, in a rotary plane of the bending die 31 at the start of rotary draw bending illustrated in FIG. 2, in relation to the feeding direction of the original tube 11, a rounded end at which a straight-line portion and a front-end rounded portion of the shank 14 meet matches the central axis of rotation 31b of the bending die 31.

The production apparatus 30 may be configured to apply a compressive force in the axial direction of the original tube 11 during bending by being equipped with a back booster 35 that pushes the original tube 11 in the axial direction, or by moving the pressure die 34 in the feeding direction of original tube at a higher speed than the rotational speed of the bending die 31.

3. Production Method According to the Present Invention

The production method according to the present invention is performed using the production apparatus 30. According to the production method of the present invention, the bent tube 13 having the bending portion 12-1 that is two-dimensionally bent is produced by performing rotary draw bending on the straight tube 11 using the bending die 31, the cramping die 32, the wiper 33, the pressure die 34 and the mandrel 10 that are described above.

At the start of production of the bent tube 13 illustrated in FIG. 2, the mandrel 10 is disposed at the reference position inside the original tube 11 in a manner such that the first position 19 of the mandrel ball 16 is located facing the portion corresponding to outermost of bend 11e of the original tube 11, and the second position 20 of the mandrel ball 16 is located facing the portion corresponding to innermost of bend 11f of the original tube 11.

Therefore, during bending, a gap between the mandrel ball 16 and the portion corresponding to outermost of bend 11e of the original tube 11 can be enlarged in comparison to the conventional configuration. By this means, while preventing the occurrence of rupturing of the outside of bend 12b of the bending portion 12-1 of the bent tube 13, flattening of the cross-section of the bending portion 12-1 as well as the occurrence of wrinkles or buckling at the inside of bend 12a can each be inhibited to within an allowable range.

The dimension $L_3$ in the axial direction of the mandrel ball 16 is preferably within the range of $L_3=0.3\ D_1$ to $0.5\ D_1$, and the distance $L_4$ in the mandrel ball axial direction between the most frontward end portion of the mandrel ball 16 and the reference position is preferably within the range of $L_4=0.5\ D_1$ to $0.7\ D_1$.

In addition, during bending, a compressive force may be applied in the axial direction to the original tube 11 by pressing the original tube 11 in the axial direction by means of the back booster 35, or by moving the pressure die 34 in the feeding direction of original tube at a higher speed than the rotational speed of the bending die 31.

4. Bent Tube According to the Present Invention

The bent tube 13 that is produced by means of the aforementioned production method and production apparatus according to the present invention has at least one bending portion 12-1 that is two-dimensionally bent. The tensile strength in the longitudinal direction of the tube at a straight tube portion is preferably 980 MPa or more, and further preferably is within a range of 980 to 1179 MPa.

When a wall thickness of the bending portion 12-1 of the bent tube 13 is represented by $t_1$ (mm), a wall thickness of the straight tube portion 12-2 that is other than the bending portion 12-1 is represented by $t_2$ (mm), the outside diameter is represented by $D_1$ (mm), a bending radius of the bending portion 12-1 is represented by R (mm), and a bending angle of the bending portion 12-1 is represented by $\theta(°)$, the bent tube 13 also has the characteristics enumerated hereunder.

(4-1) $t_2/D_1$: 0.005 to 0.3

(4-2) $t_2$: 0.5 to 30

(4-3) $D_1$: 15 to 700

(4-4) R: $1\ D_1$ to $6\ D_1$ (4-5) $\theta$: 0° to 180°

(4-6) Maximum thickness reduction ratio: 14.5% or less

The maximum thickness reduction ratio is determined as the maximum value of $\{(t_2-t_1)/t_2\}\times 100$ (%).

(4-7) Maximum flattening ratio: 8.0% or less

The maximum flattening ratio is determined as the maximum value of {(maximum value of outside diameter−minimum value of outside diameter)/$D_1$}×100 (%) of the bending portion 12-1.

(4-8) Hardness ratio between straight tube portion and bending portion: 8 to 50%

The hardness ratio between straight tube portion and bending portion is determined as {(average value of values obtained by measuring an L cross-section of a center portion of an outside of bend 12b of a bending portion 12-1 at 5 points under conditions of a 1 mm pitch in a longitudinal direction of the tube with Hv (10 kg))−(average value of values obtained by measuring an L cross-section of a straight tube portion 12-2 at 5 points under conditions of a 1 mm pitch in a longitudinal direction of the tube with Hv (10 kg))}/(average value of values obtained by measuring an L cross-section of a straight tube portion 12-2 at 5 points under conditions of a 1 mm pitch in a longitudinal direction of the tube with Hv (10 kg)).

Thus, the bent tube 13 has a combination of these characteristics, and in particular has a combination of high strength, and an appropriate flattening ratio and a thickness reduction ratio of a satisfactory level. Therefore, the bent tube 13 can be used as the starting material for a product as it is without being performed a secondary operation such as tube hydroforming, or can be subjected to a secondary operation to thereby produce an end product.

EXAMPLES

Figure 2:
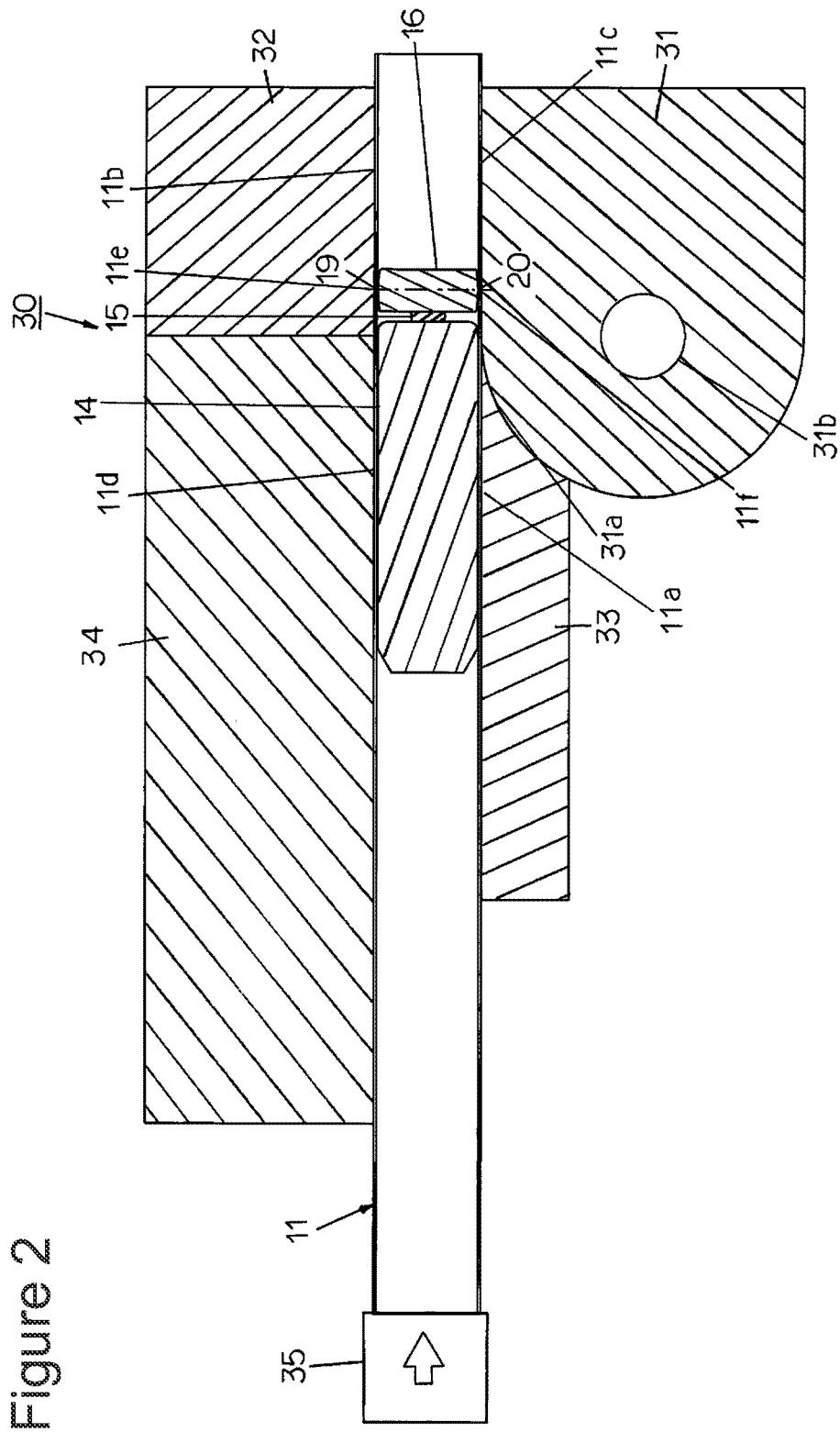
FIG. 2 is an explanatory drawing illustrating a state at the start of rotary draw bending.
Figure 3:
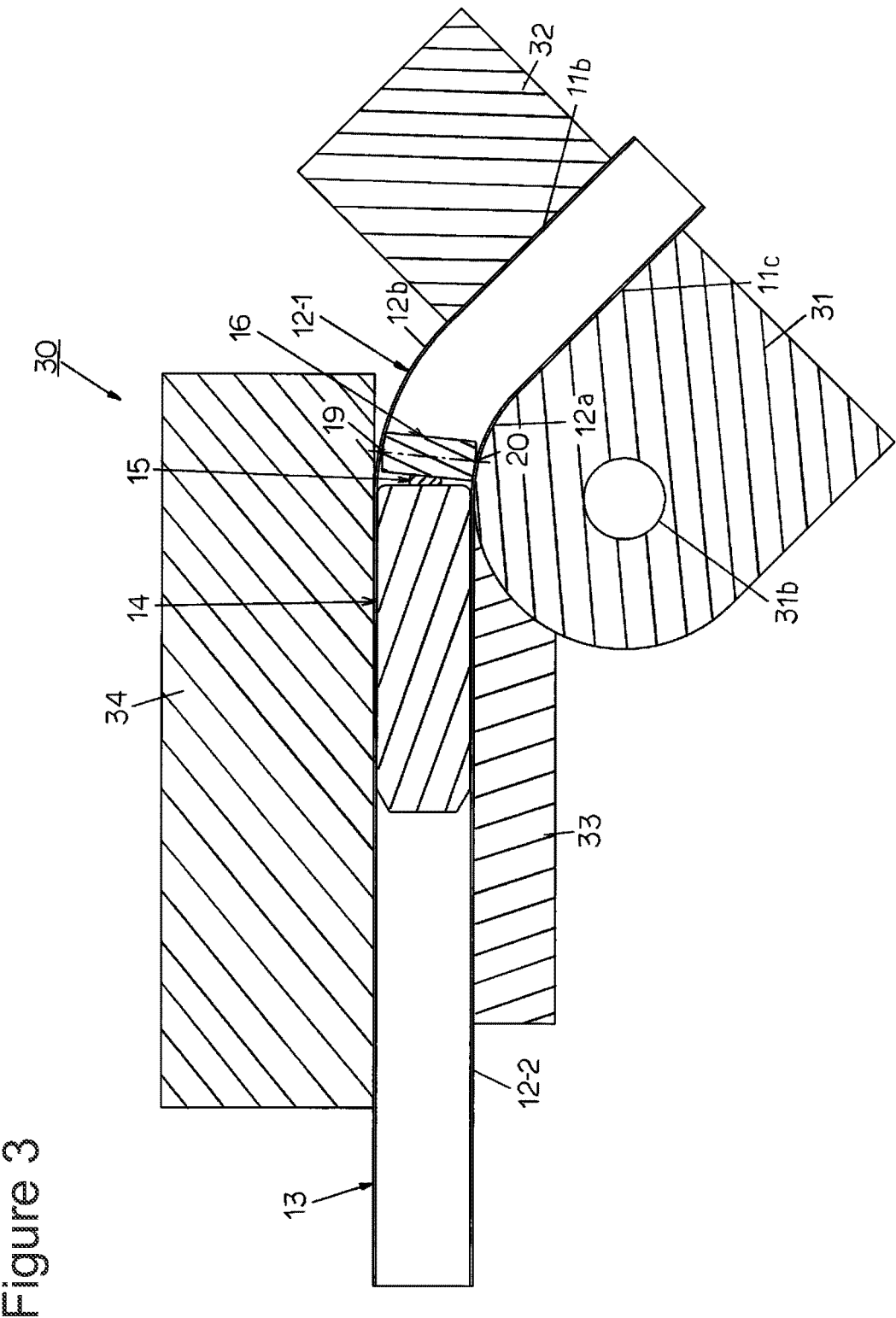
FIG. 3 is an explanatory drawing illustrating a state at the end of rotary draw bending.

A rotary draw bending apparatus in which a conventional mandrel 8 illustrated in FIG. 5(a) and FIG. 5(b) was disposed at the reference position (conventional example 1), a rotary draw bending apparatus in which a conventional ball-type mandrel 8 illustrated in FIG. 5(a) and FIG. 5(b) was disposed at a position that was drawn back from the reference position (conventional example 2), and a rotary draw bending apparatus that used the mandrel 10 according to the present invention illustrated in FIGS. 1 to 3 (example embodiments 1 to 3 of the present invention) were used, respectively, to produce bent tubes 13 and 6 illustrated in FIGS. 3 and 5(b) under the following conditions with regard to the original tubes 1 and 11. That is, the conditions were: tensile strength of the original tubes 1 and 11: 980 MPa; wall thickness $t_2$ of straight tube portion 12-2: 1.0 mm; outside diameter $D_1$ of straight tube portion 12-2: 38.1 mm; bending radius R of bending portions 12-1 and 9: 76.2 mm; and bending angle of bending portions 12-1 and 9: 90°. The thus produced bent tubes 13 and 6 were analyzed by FE simulation, and the maximum flattening ratio, maximum thickness reduction ratio and hardness ratio between straight tube portion and bending portion of the bending portions 12-1 and 9 were determined by the aforementioned method.

In Table 1, a case where the maximum flattening ratio is 8.0% or less and the maximum thickness reduction ratio is 14.5% or less is evaluated as "satisfactory".

Figure 4:
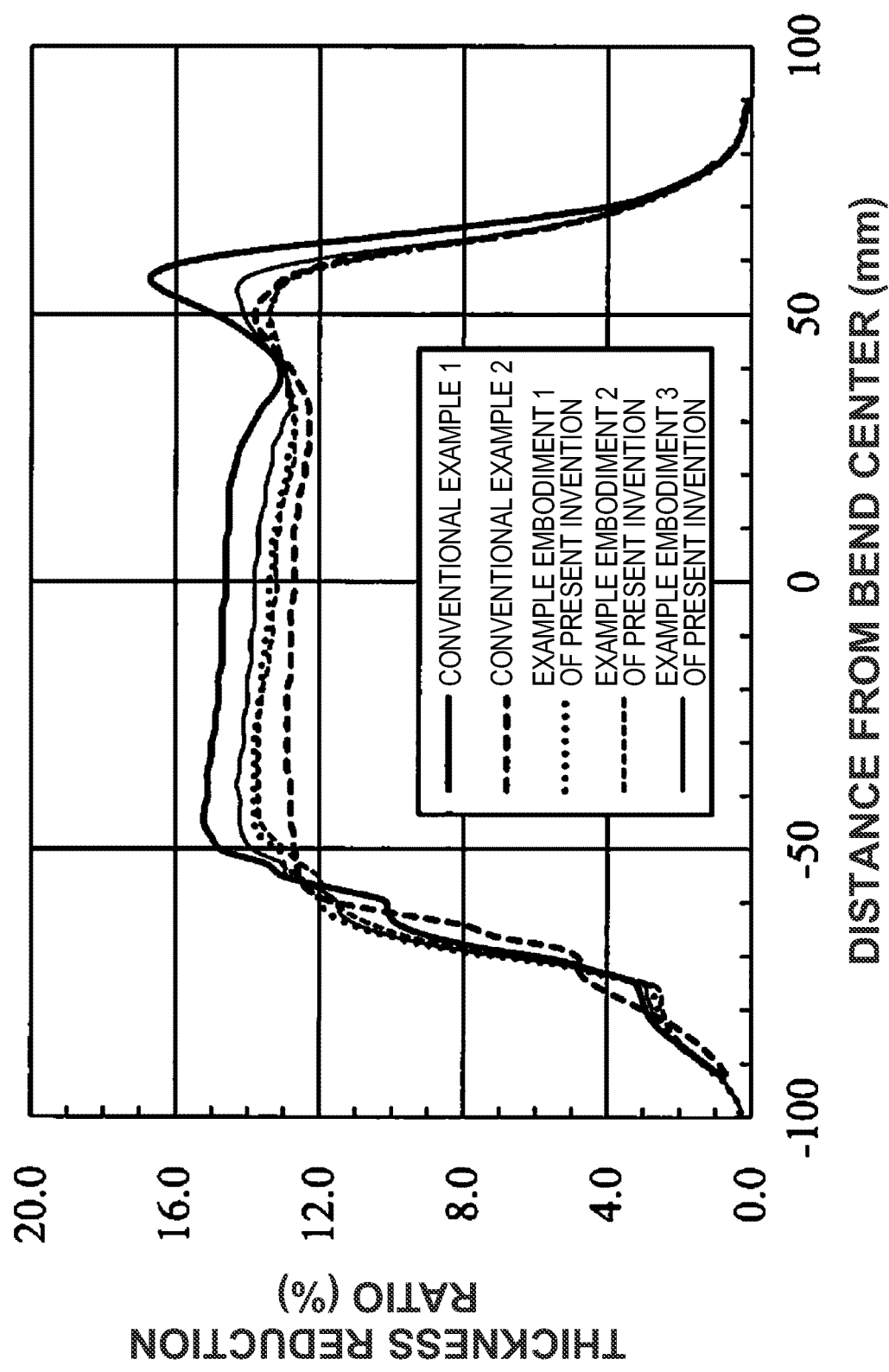
FIG. 4 is a graph showing results relating to thickness reduction ratios.

The results regarding the thickness reduction ratio are shown in a graph in FIG. 4, and the results regarding the maximum flattening ratio and the maximum thickness reduction ratio are shown in Table 1.

TABLE 1

| Classification | Bending Portion Wall Thickness $t_1$ (mm) | Straight Tube Portion Wall Thickness $t_2$ (mm) | Straight Tube Portion Outside Diameter $D_1$ (mm) | Bending Portion Bending Radius R (mm) | Bending Portion Bending Angle θ (°) | Ratio ($L_1/L_2$) | Maximum Flattening Ratio (%) | Maximum Thickness Reduction Ratio (%) | Hardness Ratio Between Straight Tube Portion And Bending Portion | Evaluation |
|---|---|---|---|---|---|---|---|---|---|---|
| Conventional Example 1 (Reference Position) | 0.833 | 1.0 | 38.1 | 76.2 | 90 | 1.0 | 8.9 | 16.7 | 17% | Maximum Thickness Reduction Ratio Excessive |
| Conventional Example 2 (Mandrel at a Drawn-back Position) | 0.862 | 1.0 | 38.1 | 76.2 | 90 | 1.0 | 14.8 | 13.8 | 14% | Maximum Flattening Ratio Excessive |
| Example Embodiment 1 of Present Invention | 0.861 | 1.0 | 38.1 | 76.2 | 90 | 0.953 | 7.5 | 13.9 | 14% | Satisfactory |
| Example Embodiment 2 of Present Invention | 0.863 | 1.0 | 38.1 | 76.2 | 90 | 0.918 | 7.9 | 13.7 | 13% | Satisfactory |
| Example Embodiment 3 of Present Invention | 0.857 | 1.0 | 38.1 | 76.2 | 90 | 0.976 | 7.7 | 14.3 | 14% | Satisfactory |

In the conventional example 1, because the maximum thickness reduction ratio during rotary draw bending is large, even if cracks do not occur during rotary draw bending, for example, if a secondary operation such as tube hydroforming is performed after rotary draw bending, there is a risk that cracks will occur in the bent tube.

The conventional example 2 is a known method that reduces the maximum thickness reduction ratio in rotary draw bending. Although the conventional example 2 is certainly capable of reducing the maximum thickness reduction ratio, the maximum flattening ratio worsens and the obtained bent tube cannot be used as a product unless a secondary operation such as hydroforming is performed on the obtained bent tube.

In contrast, in example embodiments 1 to 3 of the present invention, the maximum flattening ratio was 7.5 to 7.9% and the maximum thickness reduction ratio was 13.7 to 14.3%, and prevention of an increase in the maximum thickness reduction and prevention of a deterioration in the maximum flattening ratio could both be achieved at a high level in a compatible manner.

The bent tube 13 of each of the example embodiments 1 to 3 of the present invention had a high strength, an appropriate flattening ratio and a thickness reduction ratio of a satisfactory level. Therefore, the bent tube 13 can be used as the starting material for a product as it is without being performed a secondary operation such as tube hydroforming, or can be further subjected to a secondary operation to be made into an end product.

REFERENCE SIGNS LIST

1 Original Tube
1a Portion corresponding to inside of bend
1b End portion at outside of bend
1c End portion at inside of bend
1d Portion corresponding to outside of bend
2 Bending Die
2a Groove
2b Central Axis Of Rotation
3 Cramping Die
4 Wiper
5 Pressure Die
6 Bent tube
7 Back Booster
8 Mandrel
8a Shank
8b Connection Mechanism
8c Mandrel Ball
9 Bending portion
9a Inside of bend
9b Outside of bend
10 Mandrel According To Present Invention
11 Original Tube
11a Portion corresponding to inside of bend
11b End portion at outside of bend
11c End portion at inside of bend
11d Portion corresponding to outside of bend
11e Portion corresponding to outermost of bend
11f Portion corresponding to innermost of bend
12a Inside of bend
12b Outside of bend
13 Bent tube
14 Shank
14a Shank Center
15 Connection Mechanism _p0 16 Mandrel Ball
17 Mandrel Ball Center
19 First Position
20 Second Position
21 Outer Periphery Of Mandrel Ball
22 First Region
23 Second Region
30 Production Apparatus
31 Bending Die
31a Groove
31b Central Axis Of Rotation
32 Cramping Die
33 Wiper
34 Pressure Die
35 Back Booster
m First Straight Line
n Second Straight Line

The invention claimed is:

1. A bent tube made of steel that comprises a bending portion that is two-dimensionally bent in a rotary draw bending operation and a straight tube portion, wherein:
when a wall thickness of the bending portion is represented by $t_1$ (mm), a wall thickness of the straight tube portion is represented by $t_2$ (mm), an outside diameter of the straight tube portion is represented by $D_1$ (mm), a bending radius of the bending portion is represented by R (mm), and a bending angle of the bending portion is represented by $\theta(°)$,
$t_2/D_1$: 0.005 to 0.3,
$t_2$: 0.5 to 30,
$D_1$: 15 to 700,
R: 1 $D_1$ to 6 $D_1$,
$\theta$: 0 to 180,
a maximum thickness reduction ratio: 14.5% or less,
a maximum flattening ratio: 8.0% or less, and
a hardness ratio between straight tube portion and bending portion: 8 to 50%;
where,
the maximum thickness reduction ratio: a maximum value of $\{(t_2-t_1)/t_2\}\times 100(\%)$,
the maximum flattening ratio: a maximum value of {(maximum value of outside diameter−minimum value of outside diameter)/$D_1$} of the bending portion×100 (%), and
the hardness ratio between straight tube portion and bending portion: {(average value of values obtained by measuring 5 points under conditions of a 1 mm pitch in a longitudinal direction of the tube with Hv (10 kg) at a center portion of an outside of bend in the longitudinal direction of the tube in an L cross-section of the tube)−(average value of values obtained by measuring 5 points under conditions of a 1 mm pitch in a longitudinal direction of the tube with Hv (10 kg) at the straight tube portion in the L cross-section of the tube)}/(average value of values obtained by measuring 5 points under conditions of a 1 mm pitch in a longitudinal direction of the tube with Hv (10 kg) at the straight tube portion in the L cross-section of the tube).

* * * * *